United States Patent [19]

Morikawa

[11] Patent Number: 4,594,535

[45] Date of Patent: Jun. 10, 1986

[54] BRUSHLESS, DIRECT CURRENT MOTOR WITH AN ENERGY DISSIPATING CIRCUIT

[75] Inventor: Seiichi Morikawa, Yachiyo, Japan

[73] Assignee: Teac Corporation, Tokyo, Japan

[21] Appl. No.: 705,547

[22] Filed: Feb. 26, 1985

[30] Foreign Application Priority Data

Feb. 29, 1984 [JP] Japan ............................. 59-37770

[51] Int. Cl.[4] ............................................. H02P 6/02
[52] U.S. Cl. .................................. 318/254; 318/434; 318/563
[58] Field of Search ................. 318/138, 254 A, 254, 318/439, 434, 563

[56] References Cited

U.S. PATENT DOCUMENTS

| 3,611,081 | 10/1971 | Watson | 318/254 X |
| 3,688,172 | 8/1972 | Sieber et al. | 318/254 |
| 3,916,272 | 10/1975 | Grunleitner et al. | 318/254 X |
| 4,132,930 | 1/1979 | Schalk | 318/254 X |
| 4,249,116 | 2/1981 | Hieda | 318/254 |

Primary Examiner—William M. Shoop, Jr.
Assistant Examiner—Bentsu Ro
Attorney, Agent, or Firm—Woodcock Washburn Kurtz Mackiewicz & Norris

[57] ABSTRACT

A brushless dc motor has switching transistors to be sequentially made conductive to cause sequential excitation of field windings from a dc power supply and hence to cause rotation of an armature. The switching transistors are provided with respective protection diodes connected in parallel therewith and in an opposite polarity. The field windings are further connected, via respective energy release diodes opposite in polarity to the protection diodes, to a common energy dissipating circuit comprising a capacitor and two transistors having their emitters grounded. The energy dissipating circuit can take up the electric energy produced in the field windings during the nonconducting periods of the switching transistors.

3 Claims, 4 Drawing Figures

BRUSHLESS, DIRECT CURRENT MOTOR WITH AN ENERGY DISSIPATING CIRCUIT

BACKGROUND OF THE INVENTION

This invention relates to electric motors in general and, in particular, to a brushless, direct current (dc) motor wherein a rotor or armature is revolved by sequential or cyclic excitation of a set of stationary field windings from a dc power supply.

In a typical conventional brushless dc motor (shown in FIG. 1 of the drawings attached hereto), a plurality of switching transistors are cyclically rendered conductive for brief lengths of time to cause respective field windings to be energized cyclically by a dc power supply. A rotor or armature, as in the form of a permanent magnet, rotates in response to the cyclic excitation of the field windings.

A problem with this type of dc motor is the disposal of the electric energy produced by the field windings upon nonconduction of the associated switching transistors. A conventional solution to this problem has been to connect a capacitor in parallel with each field winding via a diode. The capacitors are intended to absorb the voltage surges generated by the field windings upon nonconduction of the switching transistors. It is objected, however, to the provision of just as many capacitors as the field windings as they make the electrical construction of the dc motor complex and expensive.

The dc motor of the type in question has had another problem in connection with the rapid electrical braking of the rotor. A shorting switch in the form of a relay contact pair has heretofore been connected in parallel with each field winding to that end. The mechanical switches are of course very susceptible to malfunctioning and so have impaired the reliability of the dc motor.

SUMMARY OF THE INVENTION

This invention greatly simplifies the means, in the brushless dc motor of the kind under consideration, for dissipating the energy produced by the field windings upon their deenergization. This invention also succeeds in the simplification of the means for electrically braking the rotor of the motor.

Briefly, this invention concerns a brushless dc motor driven from a dc power supply having first and second opposite poles. It comprises a plurality of field windings wound around respective field poles of a stator and each having a first extremity adapted to be connected to the first pole of the dc power supply. For the cyclic excitation of the field windings from the dc power supply, there are provided a plurality of switching transistors each to be connected substantially between the second pole of the dc power supply and a second extremity of one field winding. A rotor rotates relative to the stator in response to the sequential excitation of the field windings. Each switching transistor is provided with a protection diode connected in parallel therewith and in an opposite polarity. The second extremities of the field windings are further connected, via respective energy release diodes opposite in polarity to the protection diodes, to a common energy dissipating circuit comprising a capacitor and two transistors having their emitters grounded. The energy dissipating circuit can take up the electric energy produced by the field windings during the nonconducting periods of the switching transistors.

It will be appreciated that the field windings are connected via the respective energy release diodes to the common energy dissipating circuit. The provision of energy dissipating means for each field winding, as has been the case heretofore, has thus become unnecessary.

The above and other features and advantages of this invention and the manner of realizing them will become more apparent, and the invention itself will best be understood, from a study of the following description and appended claims, with reference had to the attached drawings showing a preferred embodiment of the invention as well as the typical prior art dc motor which is believed most pertinent to this invention.

DETAILED DESCRIPTION

Figure 1:
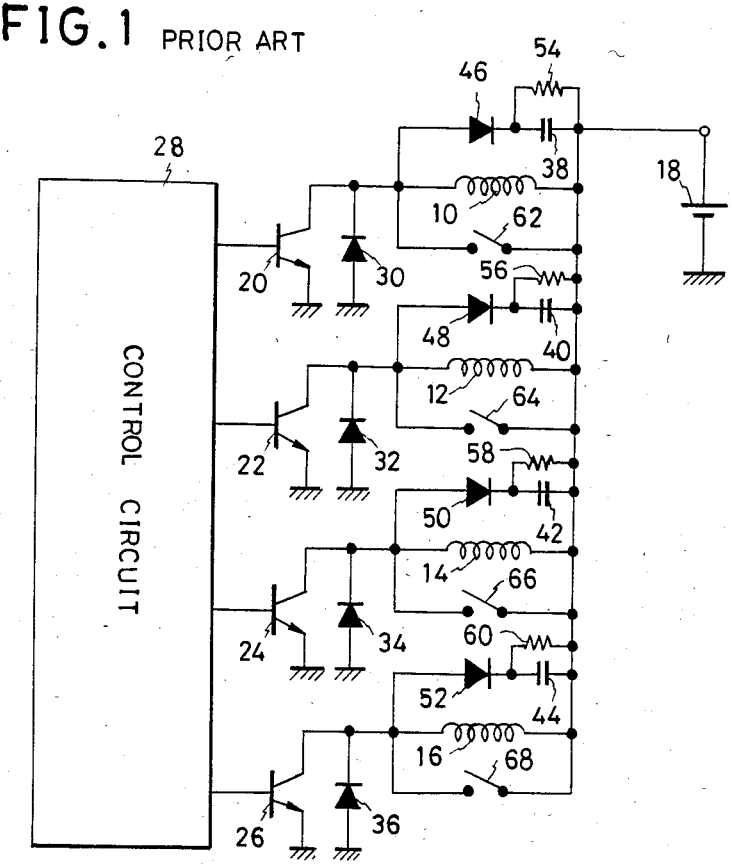
FIG. 1 is a schematic electrical diagram of the prior art brushless dc motor.

The prior art brushless dc motor of FIG. 1 will be described first in some more detail, the better to make clear the features and advantages of the invention. The prior art motor is shown to have four field windings 10, 12, 14 and 16 excited cyclically from a DC power supply 18 as four associated switching transistors 20, 22, 24 and 26 become conductive in response to signals from a control circuit 28. The switching transistors 20, 22, 24 and 26 are provided with protection diodes 30, 32, 34 and 36, respectively. The field windings 10, 12, 14 and 16 are connected in parallel with capacitors 38, 40, 42 and 44 via diodes 46, 48, 50 and 52, respectively. These capacitors are further connected in parallel with resistors 54, 56, 58 and 60, respectively. So connected, the capacitors 38, 40, 42 and 44 can absorb the voltage surges produced by the field windings 10, 12, 14 and 16 upon nonconduction of the switching transistors 20, 22, 24 and 26.

The prior art dc motor of FIG. 1 is further provided with normally open, shorting switches 62, 64, 66 and 68 connected in parallel with the field windings 10, 12, 14 and 16, respectively, for electrically braking the rotation of the rotor or armature (not shown in FIG. 1). Each in the form of a relay contact pair, the shorting switches brake the rotor by being closed to short the field windings 10, 12, 14 and 16 of the motor acting as a generator as the rotor revolves by inertia.

The prior art dc motor of the foregoing described construction is objected to by reason of the provision of the energy absorbing capacitors 38, 40, 42 and 44 and the shorting switches 58, 60, 62 and 64 for the respective field windings 10, 12, 14 and 16. They make the electrical construction of the dc motor unnecessary complex, difficult of manufacture, and expensive.

Figure 3:
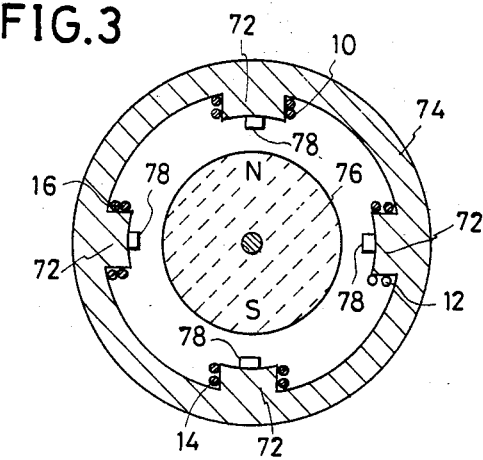
FIG. 3 is a cross section representation of the mechanical construction of the motor of FIG. 2.
Figure 2:
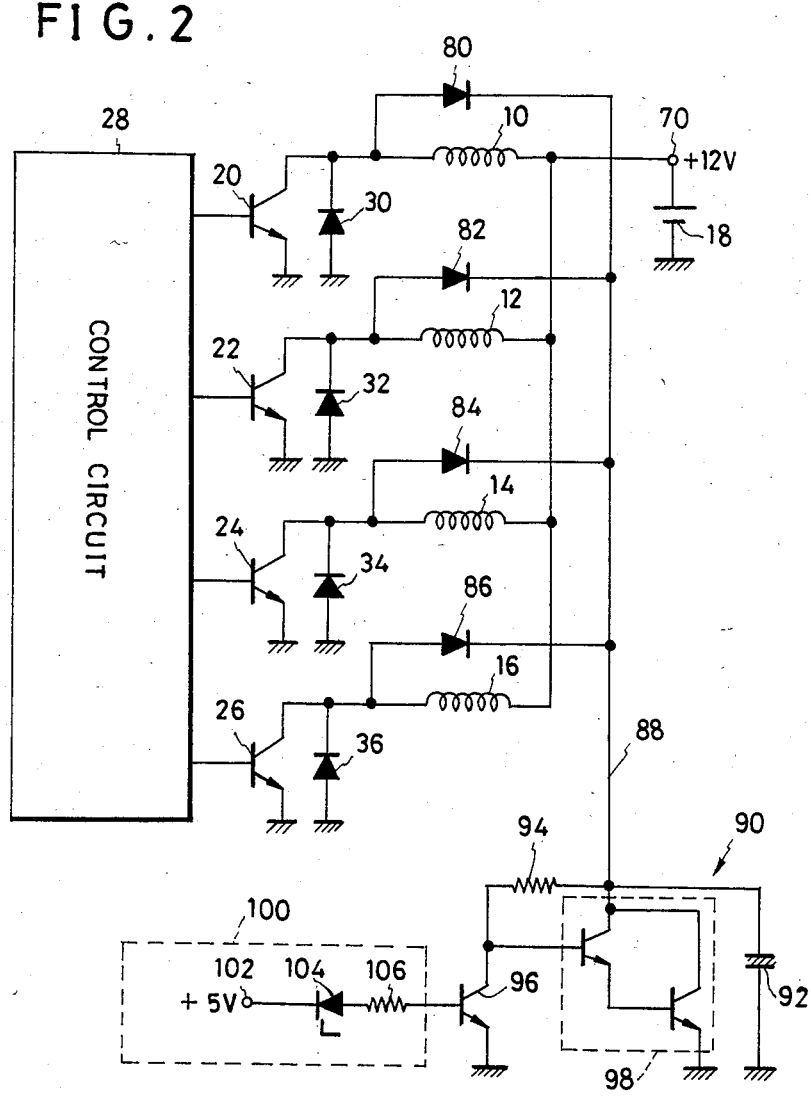
FIG. 2 is a similar diagram of the brushless dc motor constructed in accordance with the novel concepts of the invention.

In FIGS. 2 and 3 the improved brushless dc motor incorporating the novel concepts of the invention have been illustrated. In the following description of this motor, some of its parts by the same reference numerals as those used to denote the corresponding parts of the prior art motor of FIG. 1 will be identified.

The four field windings 10, 12, 14 and 16 have their first extremities interconnected and further coupled to a DC supply terminal 70. The DC power supply 18, having an output voltage of 12 volts, for example, has its first or positive pole connected to the supply terminal 70 and its second or negative pole grounded. The second extremities of the field windings are connected to the collectors of the switching transistors 20, 22, 24 and 26, respectively, whose emitters are grounded. Thus the switching transistors may be throught of as being connected between the second extremities of the respective field windings and the second pole of the dc power supply 18. The bases of the switching transistors are all separately connected to the control circuit 28.

As will be seen from FIG. 3, the field windings 10, 12, 14 and 16 are wound one around each salient field pole 72 of a stator 74. A rotor or armature 76, herein shown as a permanent magnet, is arranged concentrically within the stator 74. A Hall effect device 78 is mounted on each field pole 72, and electrically connected to the control circuit 28, for sensing the angular position of the rotor 76.

Figure 4:
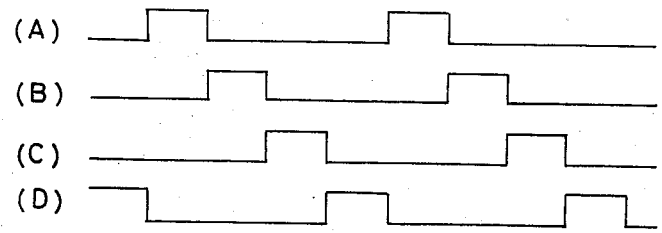
FIG. 4 is a waveform diagram useful in explaining the operation of the motor of FIGS. 2 and 3.

Generally self excited, the control circuit 28 delivers electric signals such as those depicted at (A) through (D) in FIG. 4 to the bases of the switching transistors 20, 22, 24 and 26, thereby cyclically causing conduction therethrough. The conduction of these transistors results of course in the energization of the associated field windings 10, 12, 14 and 16 by the dc power supply 18. The control circuit 28 generates the signals in accordance with the angular position of the rotor 76 as detected by the Hall effect devices 78 on the field poles 72.

The protection diodes 30, 32, 34 and 36 are connected in parallel with the switching transistors 20, 22, 24 and 26 and in an opposite polarity thereto.

Further the improved dc motor comprises a set of energy release diodes 80, 82, 84 and 86, each having a first end connected to the second extremity of the associated one of the four field windings 10, 12, 14 and 16. The second ends of all the energy release diodes are connected to a common line 88 leading to an energy dissipating circuit, generated designated 90, for dissipating the energy produced by the field windings during the nonconducting periods of the switching transistors. It will be noted that the energy dissipating circuit 90 is grounded, so that it is essentially connected between the interconnected ends of the energy release diodes 80, 82, 84 and 86 and the second pole of the dc power supply 18.

The energy dissipating circuit 90 comprises a capacitor 92, a resistor 94, and first 96 and second 98 energy dissipating transistors. The capacitor 92 is intended for the absorption of surge energy from the field windings 10, 12, 14 and 16 and is connected between the common line 88 and ground. The first energy dissipating transistor 96 has its collector connected to the common line 88 via the resistor 94, its emitter grounded, and its base connected to a transistor control circuit 100 yet to be described. Preferably, and as shown, the second energy dissipating transistor 98 is a Darlington transistor, comprising two discrete transistors in a Darlington connection. The second energy dissipating transistor 98 has its collector connected directly to the common line 88, its emitter grounded, and its base connected to the common line 88 via the resistor 94.

The transistor control circuit 100 functions to cause conduction through the first energy dissipating transistor 96 only during the rotation of the motor. Included is a supply terminal 102 to which a supply voltage of, say, five volts is to be impressed during the rotation of the motor. The five volt supply terminal 102 is connected via a four volt Zener diode 104 and a resistor 106 to the base of the first energy dissipating transistor 96.

OPERATION

The rotor 76 of the improved brushless dc motor of the foregoing construction can be set into rotation as the pulses of FIG. 4 are cyclically impressed to the switching transistors 20, 22, 24 and 26 to cause conduction therethrough, with the consequent excitation of the associated field windings 10, 12, 14 and 16 from the 12 volt dc power supply 18, as is usual with this type of motor. Also, during such rotation of the rotor 76, the five volt supply voltage is impressed to the terminal 102 of the transistor control circuit 100. As the first energy dissipating transistor 96 of the energy dissipating circuit 90 thus becomes conductive, the resistor 94 becomes grounded therethrough and so becomes connected in parallel with the capacitor 92. The second energy dissipating transistor 98, on the other hand, has its base grounded via the first energy dissipating transistor 96 and so remains nonconductive. With the first energy dissipating transistor 96 thus rendered conductive, and the second 98 remaining nonconductive, the energy dissipating circuit 90 is now in a state to absorb the surges of the dc motor, as will be explained more fully hereafter.

Upon nonconduction of the first switching transistor 20, for instance, the first field winding 10 tends to generate a voltage surge. The impression of the surge to the first switching transistor 20 is prevented, however, as the capacitor 92 of the energy dissipating circuit 90 absorbs the surge energy via the first energy release diode 80. Being connected in parallel with the capacitor 92 via the first energy dissipating transistor 96, the resistor 94 can now consume the energy that has been stored on the capacitor 92, making the same ready to absorb the surge energy from the second field winding 12 upon nonconduction of the second switching transistor 22. Thus the energy dissipating circuit 90 can dissipate the energy produced as the switching transistors 20, 22, 24 and 26 cyclically become conductive and nonconductive.

For braking the rotor 76 to a rapid stop, the delivery of the actuating pulses from control circuit 28 to switching transistors 20, 22, 24 and 26 is terminated, and so is the impression of the five volt supply voltage to the supply terminal 102 of the transistor control circuit 100. The four switching transistors, as well as the first energy dissipating transistor 96 of the energy dissipating circuit 90 all become nonconductive. The rotor 76 continues rotation by inertia after the nonconduction of the switching transistors, so that the motor starts acting as a generator. The electromotive forces due to the field windings 10, 12, 14 and 16 supply a base current to the second energy dissipating transistor 98 of the energy dissipating circuit 90, causing conduction therethrough, through the energy release diodes 80, 82, 84 and 86, common conductor 88, and resistor 94. The conduction of the second energy dissipating transistor 98 results in the grounding of the field windings 10, 12, 14 and 16 via the energy release diodes 80, 82, 84 and 86, and therefore in the dissipation of the energy produced by the generator action of the motor.

The energy due to the first field winding 10 is released through the closed circuit comprising the first field winding 10, first energy release diode 80, common conductor 88, second energy release transistor 98, second protection diode 32, and second field winding 12, a similar closed circuit comprising the third protection diode 34 and third field winding 14, and a similar closed circuit comprising the fourth protection diode 36 and fourth field winding 16. The energy due to each of the other three field windings 12, 14 and 16 is released through a like circuit.

From what has been herein said, it is clear that the improved dc motor of this invention is materially simplified in circuit configuration since each field winding requires no surge suppression or braking means of its own. In the energy dissipating circuit 90 which particularly characterizes this invention, a surge suppression circuit is completed as the first transistor 96 becomes conductive, and the second transistor 98 nonconductive, upon application of a voltage to the supply terminal 102. Further, when the voltage on the supply terminal 102 is cut off, the first transistor 96 becomes nonconductive, and the second transistor 98 conductive, to provide a shorting path for braking the rotor 76 to a quick stop. The energy dissipating circuit 90 thus performs either of the two functions depending upon the application or nonapplication of a voltage to the supply terminal 102. The circuit configuration of the motor is further simplfieid by this dual purpose energy dissipating circuit. As will be understood, in the practice of this invention, the energy dissipating circuit will automatically perform the intended functions without any particular on/off control of the voltage impressed to the supply terminal 102, if the motor is to be set out of rotation by electrically turning it off.

Although the improved dc motor of the invention has been shown and described in terms of but one preferred form thereof, It is recognized that the invention could be embodied in other forms within the broad teaching hereof. For example, as a possible modification of the illustrated embodiment, an additional on/off control circuit might be connected to the base of the second transistor 98 of the energy dissipating circuit 90, instead of controlling the second transistor by the first transistor 96. Such an on/off control circuit would be equipped to hold the second transistor 98 nonconductive during the rotation of the rotor and to render the second transistor conductive when the rotor is set out of rotation. It will also be understood that the transistor control signals of FIG. 4 might not be generated internally, by use of the Hall effect devices 78 of FIG. 3, but externally. It is understood that all these and other modifications or changes that will readily occur to the specialists in the art fall within the scope of the invention as expressed in the following claims.

I claim:

1. A brushless dc motor driven from a dc power supply having first and second opposite poles, comprising:
   (a) a stator having a plurality of field poles;
   (b) a plurality of field windings wound one around each field pole of the stator and each having a first extremity adapted to be connected to the first pole of the dc power supply;
   (c) a plurality of switching transistors each to be connected substantially between the second pole of the dc power supply and a second extremity of one field winding, the switching transistors being adapted to be sequentially made conductive to cause the field windings to be sequentially excited from the dc power supply;
   (d) a rotor rotatable relative to the stator in response to the sequential excitation of the field windings;
   (e) a plurality of protection diodes connected one in parallel with each switching transistor and in a polarity opposite to that of each switching transistor;
   (f) a plurality of energy release diodes each having a first end connected to the second extremity of one field winding, in a polarity opposite to that of each protection diode, all the energy release diodes having second ends interconnected; and
   (g) an energy dissipating circuit to be connected substantially between the second pole of the dc power supply and the interconnected second ends of the energy release diodes, the energy dissipating circuit being effective to dissipate the energy induced in the field windings during the nonconducting periods of the switching transistors; said circuit comprising:
       a capacitor to be connected substantially between the second pole of the dc power supply and the interconnected second ends of the energy release diodes;
       a resistor having a first extremity connected to the interconnected second ends of the energy release diodes;
       a first energy dissipating transistor to be connected substantially between the second pole of the dc power supply and a second extremity of the resistor;
       a transistor control circuit for causing conduction through the first energy dissipating transistor during the rotation of the motor; and
       a second energy dissipating transistor to be connected substantially between the second pole of the dc power supply and the interconnected second ends of the energy release diodes, the second energy dissipating transistor being held nonconductive during the rotation of the motor and being rendered conductive when the motor is set out of rotation.

2. The brushless dc motor of claim 1, wherein the second energy dissipating transistor of the energy dissipating circuit has a base connected to the second extremity of the resistor.

3. The brushless dc motor of claim 1, wherein the second energy dissipating transistor of the energy dissipating circuit is a Darlington transistor.

* * * * *